Aug. 30, 1960     J. E. HATFIELD     2,950,885
PARACHUTE PACK RELEASE AND OPENING MECHANISM
Filed March 18, 1958     2 Sheets-Sheet 1

INVENTOR
John Edward Hatfield

BY *Rommel, Allwine & Rommel*
ATTORNEYS

Aug. 30, 1960 J. E. HATFIELD 2,950,885
PARACHUTE PACK RELEASE AND OPENING MECHANISM
Filed March 18, 1958 2 Sheets-Sheet 2

INVENTOR
John Edward Hatfield

BY
ATTORNEY

2,950,885

PARACHUTE PACK RELEASE AND OPENING MECHANISM

John E. Hatfield, Stotfold, England, assignor to Irving Air Chute Co., Inc., Lexington, Ky., a corporation of New York Filed Mar. 18, 1958, Ser. No. 722,277

Claims priority, application Great Britain July 19, 1957

5 Claims. (Cl. 244—141)

This invention relates to improvements in aircraft parachute equipment and has particular reference to use of parachute pack opening mechanism associated with aircraft ejection seats, wherein means is provided for insuring automatic opening of the parachute pack and deployment of a sustaining parachute with auxiliary means for manually actuating the parachute pack opening means in case of failure of the automatic opening means or malfunctioning of the ejection seat.

There are different procedures used in connection with deployment of parachutes associated with aircraft ejection seats. One such seat known as the Martin-Baker ejection seat uses a manual controlled charge which is fired and drives the seat upward upon rails. The first upward movement initiates a time delay which fires a bullet attached to a drogue parachute stored in a convenient receptacle upon the seat. The drogue parachute remains attached to the seat for stabilizing it while the aviator is still held in his safety harness. After a pre-arranged delay or at a predetermined altitude the drogue chute is released from the seat and the man's safety harness is automatically released. At that time the drogue parachute applies tension to the rip cord and pulls the main parachute from the pack; the seat falling away, unsupported. In this conventional type of ejection seat, if malfunctioning occurs it is necessary for the aviator to leave his seat and open his parachute pack manually. This is effected by use of a manual cable control which separates the anchorage means holding the drogue parachute. The aviator then unfastens his safety harness and gets out of the seat. He then pulls his manual release, or in case a barometric release mechanism is used he can depend on such for release after dropping to a predetermined altitude. It is a purpose of the present invention to obviate the necessity for manually withdrawing the anchorage connection restraining the drogue parachute by the aviator unseating himself after release of the safety harness, and then merely manually actuating his pack opening release mechanism.

A further object of this invention is the provision of parachute pack opening release mechanism having drogue parachute means for opening a parachute pack and also manual means, with associated coupling means connected with a movable seat, such as an ejection seat, in order to effect automatic release of a main parachute if the ejection seat functions properly, or to enable the aviator, without manually fumbling with releases other than the parachute opening mechanism, to leave his seat and the aircraft and safely and properly open the parachute pack for release of the main parachute.

Other objects and advantages of this invention will be apparent during the course of the following detailed description.

In the accompanying drawings, forming a part of this specification, and wherein similar reference characters designate corresponding parts throughout the several views.

Figure 1:
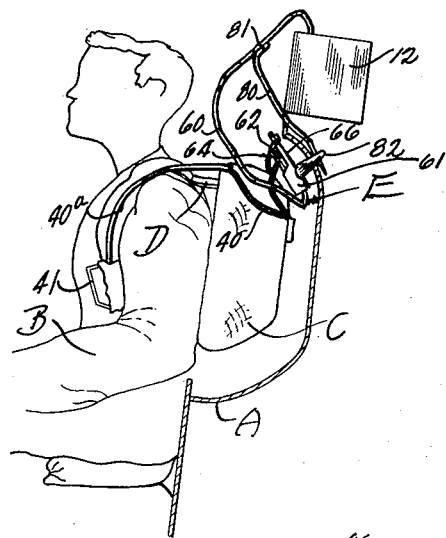
Fig. 1 is a rather diagrammatic view showing an aviator seated in an ejection seat with the parachute container opening and release mechanism properly connected upon the aviator and seat, as during flight.
Figure 2:
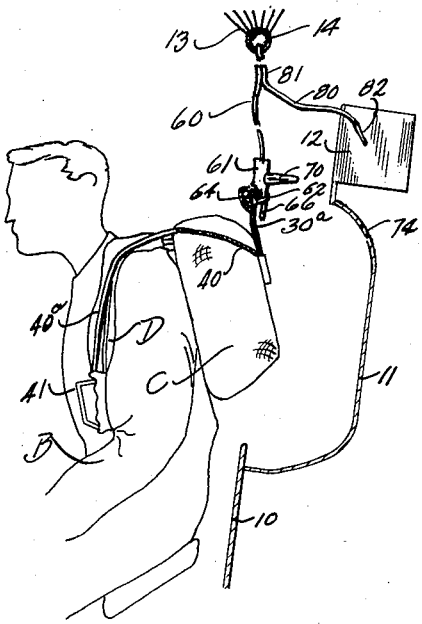
Fig. 2 is another view, mainly diagrammatic, with the parts positioned as during a bail-out after the seat has been ejected and the aviator partially freed from the seat.

In the drawings wherein for the purpose of illustration is shown only a preferred embodiment of the invention, the letter A may generally designate an ejection seat, which may be of any type, adapted to seat an aviator B, who may wear a parachute pack C upon his body, such as upon his back; the container of the pack being strapped by harness D to the aviator B. The improved releasing means for automatic and manual release of the aviator is designated at E.

The ejection seat A may include a normal back portion 10 having a recessed portion 11, which is adapted to receive the pack C of the aviator, in case a back pack is used. At the top of the seat 11 is disposed a container 12 for receiving a drogue parachute canopy (not shown) which has connected therewith the usual shroud lines 13 and a connecting ring 14.

Figure 4:
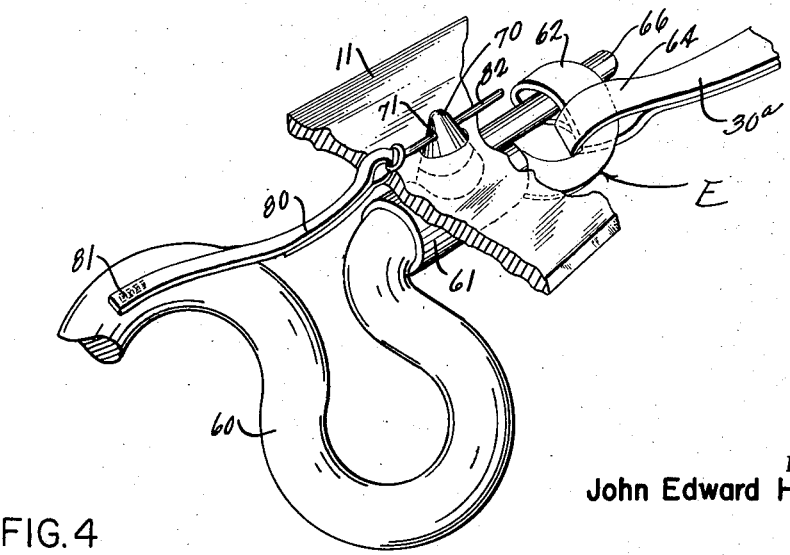
Fig. 4 is an enlarged perspective view showing an assemblage which is releasably anchored to the ejection seat and has associated coupling means in the nature of a plurality of cords, straps or flexible members which will enable the opening of the parachute pack under the conditions aforesaid.

The parachute pack C may vary in arrangement of parts, including different rearrangements of the release cordage, but the same preferably includes a container 20, side flaps 21 and 22 and end flaps 23 and 24. One of the flaps, such as the flap 20, has transversely apertured cones 26 (well known in the art), adapted to be slipped through suitable grommets or eyelets 27 provided in the other flap 21 and the end flaps 23 and 24; the cones being held in place by means of a flexible rip cord 30 having pins 31 which releasably engage through the transverse apertures of the cones 26. In the particular pack shown, the rip cord 30 is the drogue parachute operated rip cord and it has connected therewith rigid pins 31, which are adapted to be inserted in the transverse apertures of the studs 26 in order to hold the eyelets 27 in position and thus hold the flaps closed. This rip cord 30 may have its upper portion 30a formed of nylon, in cord form or in strap form as shown in Fig. 4, of the drawings. It is adapted for releasable association with the coupling means E in a manner to be subsequently described. The cord 30 may have an extension at the pack which is passed inside between the pack flaps and tied to the apex of the main parachute canopy (not shown). Thus, a release pull upon the cord 30a not only releases the pins 31 and insures opening of the container but also insures withdrawal of the main canopy.

Figure 5:
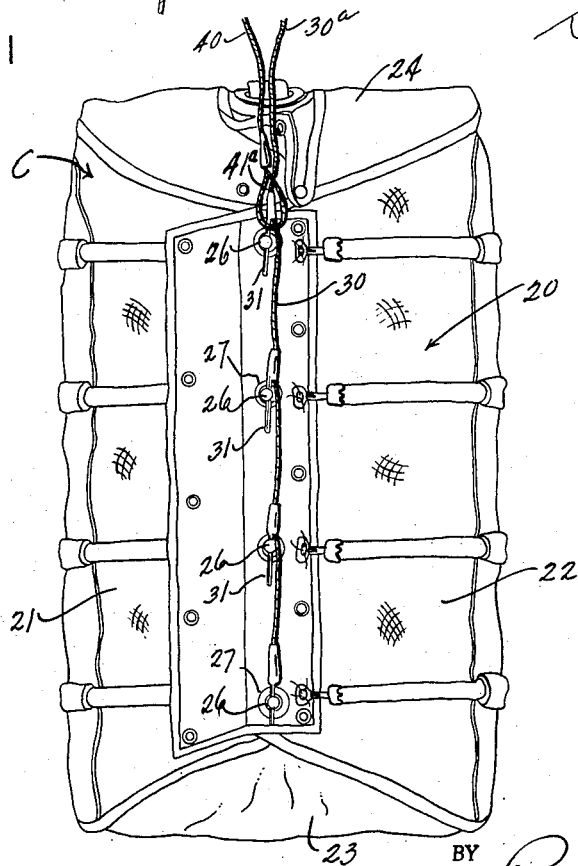
Fig. 5 is a view showing one type of back pack and its dual release means associated therewith for opening the pack under the circumstance of a successful ejection seat operation or when the ejection operation malfunctions and it is necessary for the aviator to manually release the parachute canopy.

A manual rip cord 40 is provided which terminates in a small loop or ring 41a adapted to be hooked over the first rip pin 31, as shown in Fig. 5, for the purpose of opening the pack C and withdrawing the main canopy in a manner well understood in this art. The manual over-ride rip cord cable 40 terminates in a handle 41, which the aviator grasps to effect a manual release in case of malfunctioning of the ejection seat. Barometric release mechanism may also be associated with the cord 40 in a manner which is well understood in the art, such as shown in U.S. Patent 2,676,655, and U.S. application Serial No. 600,477, filed July 27, 1956, now Patent 2,922,604. A housing 40a is usually worn on the aviator's harness to protect the cord 40.

Referring to the coupling means E, attached to the ring 14 of the drogue parachute is a flexible cord or member 60, which slidably extends through a preferably rigid sleeve 61. The latter comprises a device which may anchor the coupling means to the seat portion 11 of the ejection seat mechanism. The sleeve 61 is short and the drogue connected line 60 extends from the opposite end of the sleeve and terminates in a flexible loop 62.

The drogue operated rip cord or member 30a is flexible and likewise has a flexible loop 64 at the free end thereof adapted for cooperative action with the loop 62 in a relation to be subsequently described.

The sleeve 61 has a retaining pin 66 fixed therewith, extending preferably in alignment with the sleeve 61, but to one side of the axis passageway thereof and parallel with that portion of the drogue line 60, which extends freely from the sleeve and has a loop 62 as a part thereof.

Figure 3:
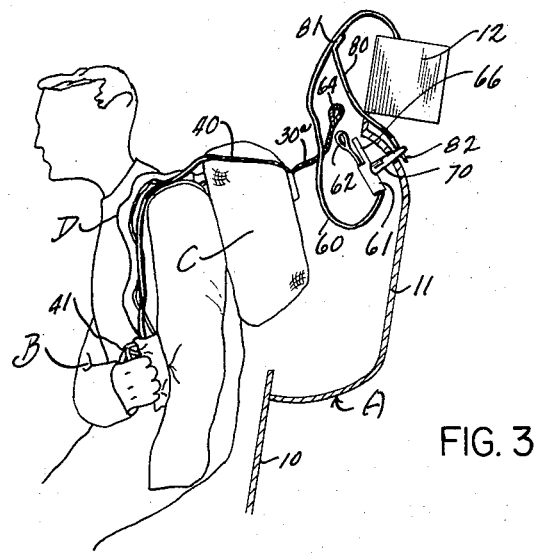
Fig. 3 is another view showing how the aviator is able to manually open the parachute pack with complete assurance that the main parachute will be released, and without the necessity of fumbling with other controls, such as are necessary under present circumstances.

The sleeve 61 has an exterior transverse or right angled cone or stud 70, rigidly connected therewith provided with a transverse passageway 71 therethrough, best shown in Fig. 4. This stud 70 is adapted to be slipped through a transverse opening 74 in the seat portion 11, in order to hold the coupling mechanism E in the rest position shown in Fig. 1, in a nonfouling orderly arrangement. A flexible strap 80 is connected at 81, to an intermediate portion of the drogue line 60 and has a detent pin 82 thereon adapted to be inserted through the opening 71 in the stud 70 in order to hold the stud 70 in releasable place upon the seat portion 11, as is shown in Figs. 1 and 3. The effective length of this line 80, that is, the effective length between the detent pin 82 and the point of connection 81 is less than the length of the drogue line 60 between the location 81 and the sleeve 61 when received therein, and therefore the parts will lie approximately in the connected position shown in Fig. 4.

The drogue line 62 has a free sliding action through the sleeve 61, as above mentioned. The coupling means E is connected for operation as shown in Fig. 4, with the loop 64 receiving therethrough the flexible loop 62. The latter is releasably disposed over the pin 66 in such relation that upon pull of the drogue line 60 the loop 62 will move in the direction of sleeve 61 for holding the loop 64 in place, during a normal drogue parachute automatic operation of the apparatus, to insure a proper pulling of the rip cord 30 for releasing the parachute canopy therein.

Assuming that the coupling structure E is in the assembled position shown in Fig. 1, and the seat ejector mechanism operates successfully, a normal bail-out will result, that is, the drogue parachute will deploy automatically upon seat ejection in any conventional manner known in the art, such as shown in U.S. Patent 2,502,470, exerting a pull on the drogue line 60 and prior to developing any pull in the looped portion of that line force will be transmitted to the detent pin strap 80, withdrawing pin 82 from the cone 70. This will free the tube or sleeve 61 from connection with the seat portion 11. Then, force of the drogue line pull will be transmitted to the looped ends associated with the pin 66 and more firmly secure the loops upon the pin. This will pull the rip cord portion 30a and the portion 30 upon which the pins 31 are mounted and thus release the parachute canopy.

If the ejector seat and associated mechanism fail to function properly or for any other reason it is desired to effect a manual operation of the parachute upon bail-out, the aviator in arising from the ejector seat will exert a pull on the lines 30a, while the tube or sleeve 61 is still attached and anchored to the seat portion 11. This pull on the cord portion 30a will be transmitted to the drogue line 60, by reason of the looped engagements above described and cause the loop 62 to slip off the retaining pin 66. The looped end 64 of the rip cord line portion 30a will pull away from the looped end 62. The aviator will then be completely free from the seat mechanism and he can either manually pull the release cord 40, or operate it barometrically or in any other way known in the art.

Various changes in the shape, size, and arrangement of parts may be made to the form of invention herein shown and described, without departing from the spirit of the invention and scope of the claims.

I claim:

1. In a coupling means for operating a plurality of release mechanisms of a parachute pack the combination of an aircraft ejection seat, a drogue parachute having a suspending line, means for releasably housing the drogue parachute upon the seat, an anchoring member, means for releasably connecting the anchoring member to said seat, the drogue parachute line having a slidable connection with said anchoring member, and means connected with the drogue line for releasing the said anchoring means from the seat prior to force pulling of the drogue parachute line such as to cause said line to slide in the anchoring member.

2. In a parachute releasing mechanism the combination of an ejection seat, a parachute pack having fasteners, a first rip cord means for opening the parachute pack fasteners to release the parachute therefrom, a second rip cord for opening the pack fasteners to release the parachute, a drogue parachute, means for housing the drogue parachute upon the ejection seat, a drogue chute suspending line, a tubular member slidably receiving the suspending line at a location remote from the drogue parachute, detent means for connecting said tubular member releasably upon the ejection seat, means connected with the drogue line for operation of the detent means and release of said tubular member from the ejection seat prior to drogue parachute actuated slidable movement of the drogue line through said tubular member, loop means connected with the drogue line and second rip cord and having a releasable connection with said tubular member whereby upon release of the tubular member from connection of the tubular member with the seat, after a seat ejection said loop means will tighten connection of the loop means with said tubular member for causing a rip cord operation pull of the second rip cord.

3. A coupling connection for attachment to aircraft ejection seats for operating a plurality of rip cords of a parachute pack comprising a drogue parachute having a flexible suspension line connected therewith, an anchoring member having a passageway therein slidably receiving the drogue line therein, detent means for releasably connecting the member to an aircraft seat, said line having a flexible loop thereon, a rigid pin fixedly connected upon said member, the parachute pack having a rip cord provided with a loop, the loop of the rip cord having the drogue line loop releasably threaded therethrough and the drogue line loop being releasably slipped over and held by said pin, the drogue line having a connection with the detent means to release said anchoring member prior to a drogue parachute line pull upon said loops.

4. In combination with an aircraft ejection seat, a personnel parachute pack including a container, a parachute canopy therein and fastener means therefor, a plurality of rip cords for operating said fastener means to release the parachute canopy including a main rip cord and a second rip cord, a tubular member, a drogue parachute having a flexible suspension line slidably disposed through said tubular member and terminating in an end loop beyond said tubular member, detent means releasably connecting said tubular member to the ejection seat and being connected to the drogue parachute suspension line for release of the tubular member from said seat by a pull upon the drogue suspension line before said line pull has an opportunity to slide said suspension line through said tubular member, said second rip cord having a flexible loop at an end thereof, a retaining pin connected with the tubular member having the loop of the drogue line releasably slipped thereover the loop of the second rip cord line being releasably looped upon the drogue line at said pin whereby when the aviator rises from his ejection seat said drogue loop will become disengaged from the pin and from the rip cord line loop to free the aviator from connection with the drogue chute and any connection with the ejection seat and thus to permit him to operate the main rip cord.

5. In a parachute release device for use with ejection aircraft seats, the combination with an ejection aircraft seat, a parachute pack having means for connecting the same to an individual and having a rip cord means for opening the same, a drogue parachute mounted upon the ejection seat, a flexible suspension line connected to the drogue parachute, an anchoring member, said drogue suspension line having a slidable connection with said anchoring member, means for releasably connecting the anchoring member to the seat including a detent and an operating line releasably connected to the drogue suspension line between the point of slidable connection of the drogue suspension line upon said anchoring member and the drogue parachute, said detent operating line being of less effective length between the anchoring member and attachment of the detent operating line with the drogue suspension line than the length of the drogue suspension line between the point of connection of the detent operating line with the drogue suspension line and the slidable connection of the drogue suspension line with the anchoring member, and means for releasably connecting said drogue suspension line to said rip cord means comprising a second detent carried by said anchoring member and releasable interconnected loop means on said suspension line and said rip cord means normally held inoperative by said second anchoring member detent.

References Cited in the file of this patent
UNITED STATES PATENTS

| | | |
|---|---|---|
| 2,502,470 | Martin | Apr. 4, 1950 |
| 2,527,020 | Martin | Oct. 24, 1950 |
| 2,708,083 | Martin | May 10, 1955 |